(12) United States Patent (10) Patent No.: US 9,347,833 B2
Wyrwas et al. (45) Date of Patent: May 24, 2016

(54) INFRARED TOUCH AND HOVER SYSTEM USING TIME-SEQUENTIAL MEASUREMENTS

(71) Applicant: QUALCOMM Incorporated, San Diego, CA (US)

(72) Inventors: John Michael Wyrwas, Mountain View, CA (US); Ying Zhou, Milpitas, CA (US); Khurshid Syed Alam, Mountain View, CA (US); Mark Stirling Caskey, San Diego, CA (US); Babak Aryan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 14/051,044

(22) Filed: Oct. 10, 2013

(65) Prior Publication Data

US 2015/0103051 A1 Apr. 16, 2015

(51) Int. Cl.
*G06F 3/042* (2006.01)
*G01J 5/08* (2006.01)
*G02B 6/10* (2006.01)
*G06F 3/041* (2006.01)

(52) U.S. Cl.
CPC .............. *G01J 5/089* (2013.01); *G02B 6/102* (2013.01); *G06F 3/0416* (2013.01); *G06F 3/0421* (2013.01); *G06F 3/0423* (2013.01); *G06F 2203/04108* (2013.01)

(58) Field of Classification Search
CPC ............ G06F 2203/04101; G06F 2203/04108; G06F 2203/04109; G06F 3/042; G06F 3/0421; G06F 3/0428; G01J 5/089; G02B 6/102
See application file for complete search history.

(56) References Cited

U.S. PATENT DOCUMENTS 8,009,944 B2 8/2011 Shimizu
8,013,845 B2 9/2011 Ostergaard et al.
(Continued)

FOREIGN PATENT DOCUMENTS

EP 2365423 A2 9/2011
JP 2005107804 A 4/2005
(Continued)

OTHER PUBLICATIONS

U.S. Appl. No. 14/546,303, Nov. 18, 2014, Seo et al.
(Continued)

*Primary Examiner* — William Boddie
*Assistant Examiner* — Jeffrey A Parker
(74) *Attorney, Agent, or Firm* — Weaver Austin Villeneuve & Sampson LLP

(57) ABSTRACT

A touch and hover-sensitive sensor system is provided. The system may include a planar light guide that has a plurality of light sources located along a first edge of the light guide and a plurality of light sensors located along a second edge of the light guide orthogonal to the first edge. The light guide may include light-turning arrangements that are configured to redirect light passing through a first side of the light guide from/along orthogonal directions within the light guide. A controller may illuminate proper subsets of the light sources; light that is emitted from the first side and that encounters an object, e.g., a fingertip, may be reflected back into the first side and then redirected to the light sensors. Depending on the light sensors that detect the highest redirected reflected light intensity and the active light sources, the controller may determine the XY/XYZ location of the object.

16 Claims, 8 Drawing Sheets

(56) References Cited

U.S. PATENT DOCUMENTS

| | | |
|---|---|---|
| 2005/0099405 A1 | 5/2005 | Dietz et al. |
| 2010/0033449 A1 | 2/2010 | Chiu et al. |
| 2010/0137033 A1 | 6/2010 | Lee |
| 2010/0156848 A1* | 6/2010 | Yatsuda ............ B29D 11/00663 345/175 |
| 2011/0221705 A1 | 9/2011 | Yi |
| 2011/0227874 A1* | 9/2011 | Fahraeus ............... G06F 3/0421 345/175 |
| 2011/0248960 A1 | 10/2011 | Gruhlke |
| 2011/0278456 A1* | 11/2011 | Kiyose ................... G01B 11/14 250/338.1 |
| 2012/0327039 A1 | 12/2012 | Kukulj |
| 2013/0082980 A1 | 4/2013 | Gruhlke et al. |
| 2013/0141395 A1 | 6/2013 | Holmgren et al. |

FOREIGN PATENT DOCUMENTS

| | | |
|---|---|---|
| WO | 03077192 A1 | 9/2003 |
| WO | 2004081502 A2 | 9/2004 |
| WO | 2005026930 A2 | 3/2005 |
| WO | 2005026938 A2 | 3/2005 |
| WO | 2011035370 A1 | 3/2011 |
| WO | 2013112392 A1 | 8/2013 |

OTHER PUBLICATIONS

International Search Report and Written Opinion—PCT/US2014/059094—ISA/EPO—Jan. 5, 2015.
International Preliminary Report on Patentability - PCT/US2014/059094 - Isa/Epo - 2016-01-26 (132649W0).

* cited by examiner

| Gray Code / Light Source | First Pattern | Second Pattern | Third Pattern | Fourth Pattern | Fifth Pattern |
|---|---|---|---|---|---|
| 1 | Off | Off | Off | Off | Off |
| 2 | Off | Off | Off | Off | On |
| 3 | Off | Off | Off | On | On |
| 4 | Off | Off | Off | On | Off |
| 5 | Off | Off | On | On | Off |
| 6 | Off | Off | On | On | On |
| 7 | Off | Off | On | Off | On |
| 8 | Off | Off | On | Off | Off |
| 9 | Off | On | On | Off | Off |
| 10 | Off | On | On | Off | On |
| 11 | Off | On | On | On | On |
| 12 | Off | On | On | On | Off |
| 13 | Off | On | Off | On | Off |
| 14 | Off | On | Off | On | On |
| 15 | Off | On | Off | Off | On |
| 16 | Off | On | Off | Off | Off |
| 17 | On | On | Off | Off | Off |
| 18 | On | On | Off | Off | On |
| 19 | On | On | Off | On | On |
| 20 | On | On | Off | On | Off |
| 21 | On | On | On | On | Off |
| 22 | On | On | On | On | On |
| 23 | On | On | On | Off | On |
| 24 | On | On | On | Off | Off |
| 25 | On | Off | On | Off | Off |
| 26 | On | Off | On | Off | On |
| 27 | On | Off | On | On | On |
| 28 | On | Off | On | On | Off |
| 29 | On | Off | Off | On | Off |
| 30 | On | Off | Off | On | On |
| 31 | On | Off | Off | Off | On |
| 32 | On | Off | Off | Off | Off |

Figure 5

INFRARED TOUCH AND HOVER SYSTEM USING TIME-SEQUENTIAL MEASUREMENTS

TECHNICAL FIELD

This disclosure relates generally to touch input systems suitable for use with display devices. More specifically, this disclosure relates to touch input systems capable of recognizing both touch input and hover (non-contact) input.

DESCRIPTION OF THE RELATED TECHNOLOGY

Various touch input technologies may be used to provide touch input capability for display devices. Due to the proliferation of smartphones and tablet computers having touch input interfaces, consumers now have increasing expectations that modern computing devices will have such touch input capabilities.

Touch input interfaces may be provided using a number of technologies, including projected capacitance, surface acoustic wave, infrared grid, and optical imaging.

One type of common infrared grid touch input system features paired infrared light sources, e.g., light emitting diodes (LEDs), and photodetectors arranged along orthogonal axes of a touch region. Each light source may be located on an opposite side of the touch region from its paired photodetector and light emitted from each light source may travel across the touch region before being detected by the light source's paired photodetector. This has the effect of creating a grid of infrared beams across the touch region. When an object, e.g., a finger, touches the touch region, the object may interrupt at least one infrared beam in each orthogonal direction, which is detected by the photodetectors associated with the interrupted beams. Based on the XY location of the photodetectors associated with the interrupted beam, an XY coordinate of the touch input may be determined.

SUMMARY

The systems, methods and devices of the disclosure each have several innovative aspects, no single one of which is solely responsible for the desirable attributes disclosed herein.

In some implementations, an apparatus may be provided that includes a substantially planar light guide having a first edge, a second edge, a first side, and a second side. The first side and the second side may be substantially planar and substantially parallel to one another and the first edge and the second edge may both be substantially parallel to the first side and to the second side and substantially orthogonal to one another. The substantially planar light guide may include a plurality of first light-turning arrangements distributed across a touch-sensitive region of the substantially planar light guide, each first light-turning arrangement configured to substantially redirect light that strikes the first light-turning arrangement from a direction that is parallel to the second edge such that the redirected light travels out of the light guide in a direction substantially normal to the first side, and a plurality of second light-turning arrangements distributed across the touch-sensitive region of the substantially planar light guide, each second light-turning arrangement configured to substantially redirect light that strikes the second light-turning arrangement from a direction substantially normal to the first side such that the redirected light travels in a direction parallel to the first edge.

In some implementations, the apparatus may also include a display and the substantially planar light guide may be overlaid on the display.

In some implementations of the apparatus, the first light-turning arrangements and the second light-turning arrangements may be arrangements such as holographic light-turning arrangements, diffractive light-turning arrangements, refractive light-turning arrangements, reflective light-turning arrangements, total-internal-reflection light-turning arrangements, or combinations thereof.

In some implementations of the apparatus, the first light-turning arrangements, the second light-turning arrangements, or the first light-turning arrangements and the second light-turning arrangements may be distributed across the touch-sensitive region of the substantially planar light guide in a pattern such as an equidistant-spacing pattern, a gradient pattern, a chirp pattern, a random pattern, or combinations thereof.

In some implementations, the first light-turning arrangements, the second light-turning arrangements, or the first light turning arrangements and the second light-turning arrangements may include light-turning features with randomized feature dimensions.

In some implementations of the apparatus, the first light-turning arrangements may be located on the first side, the second side, or the first side and the second side and the second light-turning arrangements may be located on the first side, the second side, or the first side and the second side.

In some implementations of the apparatus, each first light-turning arrangement may include a first groove substantially parallel to the first edge, each second light-turning arrangement may include a second groove substantially parallel to the second edge, and the first grooves and the second grooves may both be linear and substantially V-shaped. In some such implementations, the substantially V-shaped first grooves and second grooves are symmetrically trapezoidal in cross section. In some such further implementations, the substantially V-shaped first grooves and second grooves may each be approximately 10 μm deep, approximately 22 μm wide where the groove opens, and approximately 2 μm wide at the groove bottom.

In some implementations of the apparatus, the apparatus may also include a plurality light sources located substantially along the first edge and a plurality light sensors located substantially along the second edge. In some such further implementations, the apparatus may include a controller having at least one memory and at least one processor communicatively connected with the light sources, the light sensors, and each other. The at least one memory may store computer-executable instructions for controlling the at least one processor to: cause a proper subset of the light sources to be illuminated at a first time, obtain a signal representative of a characteristic of received light from the light sensors in association with the illumination of the proper subset of the light sources at the first time, determine, based on the signal, which one or more light sensors detected a first magnitude of light, and determine, based on the one or more light sensors that detected the first magnitude of light and the light sources in the proper subset of the light sources, an input location relative to the light guide.

In some such implementations, the at least one memory may further store computer-executable instructions for controlling the at least one processor to filter light detected by the light sensors using a bandpass filter to reject ambient light incident on the first side of the substantially planar light guide.

In some implementations, the at least one memory may further store computer-executable instructions for controlling the at least one processor to: modulate light emitted from the light sources according to a signal pattern, and filter light detected by the light sensors to identify detected light that correlates with the signal pattern.

In some implementations, the proper subset of the light sources may be a single-element subset. In some such implementations, the at least one memory further may store computer-executable instructions for controlling the at least one processor to cause each light source to be separately illuminated within a scan cycle. In some additional or alternative such implementations, the at least one memory may further store computer-executable instructions for controlling the at least one processor to: determine one XY coordinate of the input location based on the location along the first edge of the light source in the single-element set, determine the other XY coordinate of the input location based on the location along the second edge of the one or more light sensors that detected the first magnitude of light, and determine a Z coordinate of the input location based on the first magnitude of light's value.

In some further implementations, the at least one memory may further store computer-executable instructions for controlling the at least one processor to differentiate between an input location that corresponds with a touch input and an input location that corresponds with a hover input based on the first magnitude of light's value.

In some implementations, the other XY coordinate may be determined by interpolating between locations of the light sensors that detected the first magnitude of light.

In some implementations, the proper subset of the light sources may produce a Gray code pattern. In some such implementations, the at least one memory further may store computer-executable instructions for controlling the at least one processor to: cause a first proper subset to be illuminated at a first time, the first proper subset having a first block of contiguous first light sources and a second block of contiguous second light sources, wherein the first light sources and the second light sources each include approximately half of the light sources; cause a second proper subset to be illuminated at a second time, the second proper subset having a first block of contiguous first light sources and two second blocks of contiguous second light sources, wherein the first light sources and the second light sources each include approximately half of the light sources and the two second blocks each include substantially equal numbers of second light sources; and cause third through Nth proper subsets to be illuminated at third through Nth times, each third through Nth proper subset having a plurality of first blocks of contiguous first light sources and a plurality of second blocks of contiguous second light sources. Each third through Nth proper subset may have first blocks each including a quantity of contiguous first light sources that is approximately half of the quantity of first light sources in each of the first blocks of the proper subset ranked one level higher, each first block of each third through Nth proper subset may be substantially centered on the first light sources at either end of the first block or blocks of the proper subset ranked one higher, the second blocks of each third through Nth proper subset may be formed by the light sources not included in the first blocks of that third through Nth proper subset, and the first through Nth proper subsets may each be illuminated by causing either the first light sources for all of the first through Nth proper subsets to be illuminated while the second light sources for all of the first through Nth proper subsets are dark or the second light sources for all of the first through Nth proper subsets to be illuminated while the first light sources for all of the first through Nth proper subsets are dark.

In some implementations, the first through Nth times may be non-sequential.

In some implementations, an apparatus may be provided that includes a substantially planar light guide having a first edge, a second edge, a first side, and a second side. The first side and the second side may be substantially planar and substantially parallel to one another, the first edge and the second edge may be both substantially parallel to the first side and to the second side, and the first edge and the second edge may be substantially orthogonal to one another. The apparatus may also include means for redirecting light travelling through the substantially planar light guide from the first edge and in a direction substantially parallel to the second edge such that the redirected light exits the substantially planar light guide in a direction substantially normal to the first side and means for redirecting light travelling into the substantially planar light guide along a direction substantially normal to the first side such that the redirected light travels towards the second edge in a direction substantially parallel to the first edge.

In some further implementations, the apparatus may also include means for emitting light into the substantially planar light guide along the first edge and means for detecting light exiting the substantially planar light guide along the second edge. In some such implementations, the apparatus may also include processing means for determining X, Y, and Z coordinates for a touch input on or above the first side of the substantially planar light guide based on light emitted from the means for emitting light and light detected by the means for detecting light.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 5 depicts a Gray code pattern example.

Like reference numbers and designations in the various drawings indicate like elements.

DETAILED DESCRIPTION

Figure 1A:
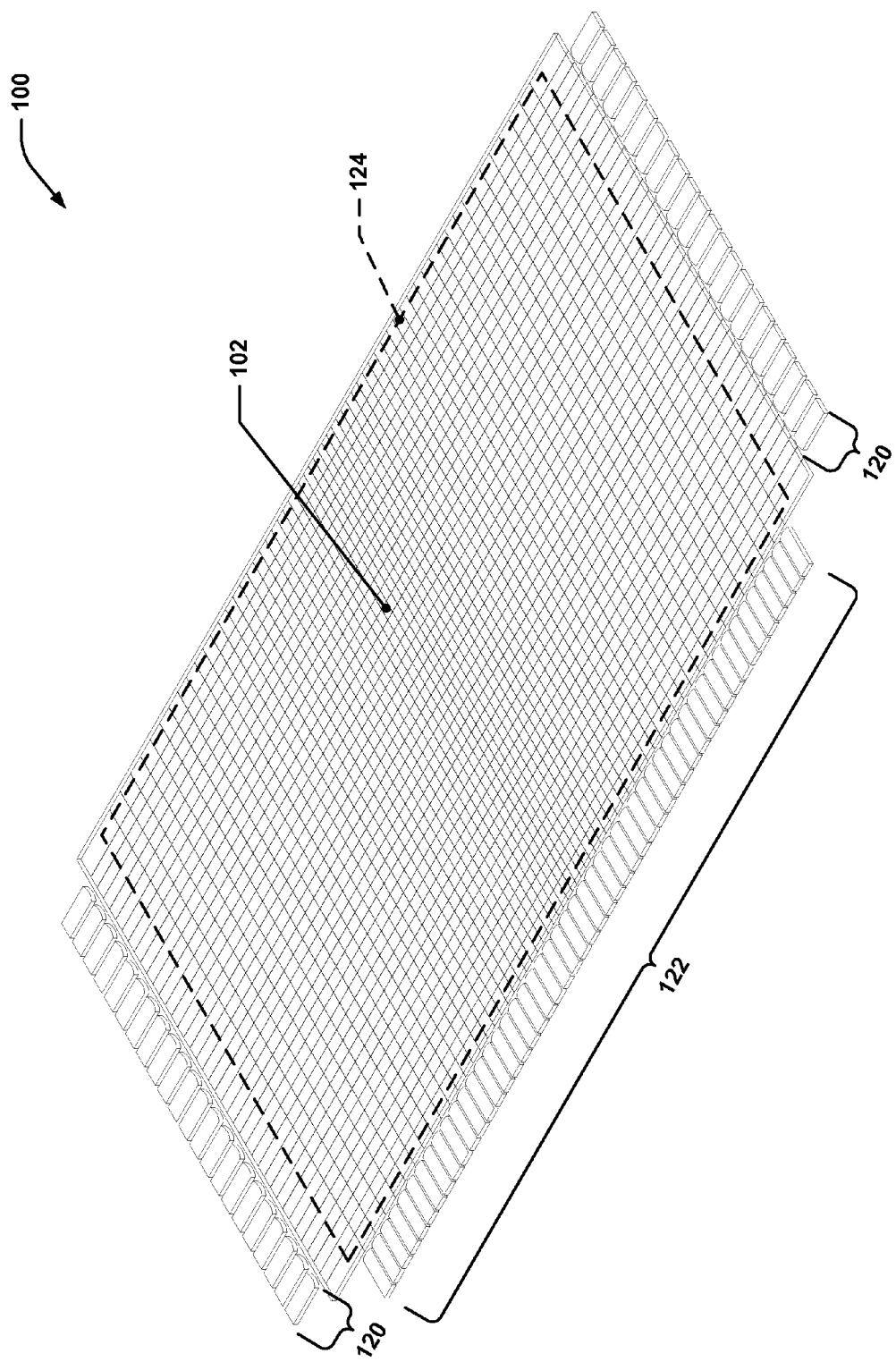
FIG. 1A depicts an isometric view of an example touch sensor.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system utilizing a touch input interface (including in devices that utilize touch input for purposes other than touch input for a display). In addition, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, and aesthetic structures (such as display of images on a piece of jewelry or clothing.

The implementations described herein relate to touch input devices that incorporate a substantially planar light guide having substantially orthogonal first and second edges. The first and second edges may both be substantially parallel to first and second sides of the light guide, and the light guide may have pluralities of first and second light-turning arrangements distributed across a touch-sensitive region of the planar light guide. Each first light-turning arrangement may be configured to substantially redirect light that strikes the first light-turning arrangement from a direction that is parallel to the second edge such that the redirected light travels out of the light guide in a direction substantially normal to the first side. Each second light-turning arrangement may be configured to substantially redirect light that strikes the second light-turning arrangement from a direction substantially normal to the first side such that the redirected light travels in a direction parallel to the first edge. A plurality of light sources may be distributed along the first edge, and a plurality of light sensors may be distributed along the second edge.

If the light sources are controlled such that proper subsets of the light sources are successively illuminated (for example, each light source may be illuminated in sequence), light that is emitted by each proper subset of the light sources may be redirected through the first side substantially along lines perpendicular to the first edge and intersecting with each illuminated light source. If the emitted light strikes an object, e.g., a fingertip, and is reflected back into the light guide, the second light-turning arrangements may redirect the reflected light in a direction generally perpendicular to the second edge and towards the light sensors distributed along the second edge. By measuring the amount of light detected by each light sensor with respect to the illumination of each proper subset, the touch input device may calculate the XY location of the touch input.

The various concepts outlined herein may be generally advantageous in a number of ways. For example, one significant advantage that is provided by many of the implementations described herein is that such touch input devices may provide "direct" touch input sensing capability as well as "hover" touch input sensing capability. "Direct" touch input refers to touch input where the object providing the input, e.g., a finger, actually touches the device having the touch input device or touches the touch input device itself "Hover" touch refers to touch input where the object providing the input, e.g., a finger, does not actually touch the device having the touch input device or the touch input device itself. For example, a hover touch could include movement of a person's finger along an axis normal to a touch-sensitive display. Such hover touch inputs, which may also be referred to as "gestures," may provide a more intuitive input paradigm than "direct" touch gestures in some cases. For example, when viewing an image or a map on a display having hover-touch capability, a hover touch input corresponding with a person's finger being moved away from the touch region of the display may be interpreted as a command to reduce the magnification of the image or map. Conversely, movement of a person's finger closer to the touch region may be interpreted as a command to increase the magnification of the image or map. Within the context of this disclosure, reference to a "touch-sensitive" region or area, "touch" sensor, "touch" input, "touch" capabilities, or the like (other than any such mention in the "Description of the Related Technology" section) of the described implementations is to be understood to be inclusive of both direct touch and hover touch. For example, the phrase "touch sensitive region" or "touch region," as used herein, is to be understood to refer to a region of a device that is configured to receive both direct touch input and hover touch input. "Hover" touch is to be understood to refer to XYZ inputs that typically correlate to a specific location as well as to gesture-based inputs that correlate to a more complex XYZ data set, e.g., a three-dimensional representation of a human hand and the various movements that the hand may undergo.

Another significant advantage provided by many of the implementations described herein is that such touch input devices do not require an electrode layers in the touch region as is required with some other touch technologies, e.g., capacitive touch. While transparent or very thin electrodes may be used to reduce occlusion of a display located underneath such electrode-based touch input devices, there may still be some degradation of light transmissivity through the touch device due to the electrodes. By contrast, the implementations of touch input devices described herein do not require electrodes in the touch region, and thus may offer better light transmissivity and thus enhanced clarity with respect to a display overlaid by such an implementation. Another advantage of such implementations is that the potential for cross-talk and interference between the touch sensor system and, for example, the display system that may be overlaid by the touch sensor system, is reduced due to the absence of electrodes for the touch input system within the touch region.

Another advantage provided by the implementations described herein is that such touch input devices may demonstrate lower power consumption than some alternative touch input devices, e.g., capacitive touch devices.

Figure 1B:
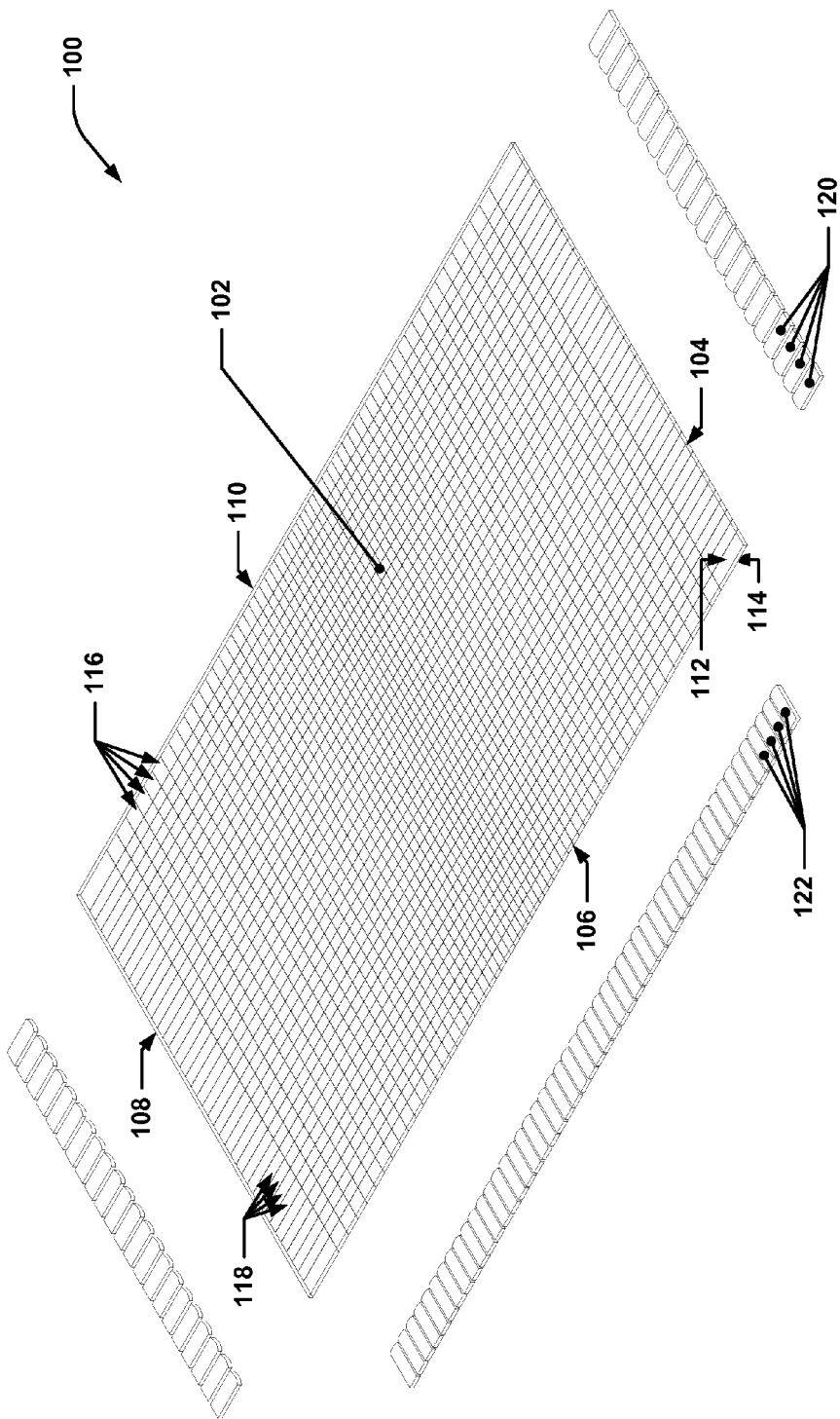
FIG. 1B depicts an isometric exploded view of the example touch sensor of FIG. 1A.

FIG. 1A depicts an isometric view of an example touch sensor. FIG. 1B depicts an isometric exploded view of the example touch sensor of FIG. 1A. Visible in FIGS. 1A and 1B is a touch sensor 100. The touch sensor 100 may include a substantially planar light guide 102, which may be made from a clear, transparent material, e.g., glass, acrylic, or other material with a high degree of high optical clarity. The planar light guide 102 may have a first side 112 and a second side 114 and may also be generally defined by a first edge 104 and a second edge 106 that is orthogonal to the first edge 104. The first side 112 and the second side 114 may be offset from one another, thus defining an overall nominal thickness of the planar light guide. The planar light guide 102 may, in some implementations, be on the order of less than a millimeter in thickness. The planar light guide 102 may also have a third edge 108 and a fourth edge 110 that are substantially parallel to the first edge 104 and the second edge 106, respectively. A portion of the planar light guide may provide a "touch-sensitive region" 124, i.e., be configured to facilitate recognition of a touch input received within the touch-sensitive region 124.

It is to be understood that reference in this disclosure to X and Y axes refers to axes that are nominally parallel to the major plane of the planar light guide 102. The X and Y axes may also be nominally parallel to or perpendicular to the first edge 104 and the second edge 106. For example, the X axis may be parallel to the first edge 104 and perpendicular to the second edge 106 and the Y axis may be perpendicular to the first edge 104 and parallel to the second edge 106. Alternatively, the X-axis and the Y-axis may be reversed with respect to the first edge 104 and the second edge 106. A Z-axis may be defined as being perpendicular to the first side 112 of the planar light guide. Of course, such coordinate systems are relative and a person of ordinary skill in the art may choose to adopt alternative coordinate system orientations or alternative coordinate systems—such alternative frames of reference do not change the fundamental principles of operation outlined herein and are considered to be within the scope of this disclosure as well.

The planar light guide 102 may also include a plurality of first light-turning arrangements 116 that are distributed across the touch-sensitive region 124. The first light-turning arrangements 116 may be configured to substantially redirect light that strikes the first light-turning arrangements 116 from a direction that is parallel to the second edge 106 such that the redirected light travels out of the light guide in a direction substantially normal to the first side 112.

The planar light guide 102 may further include a plurality of second light-turning arrangements 118 that are also distributed across the touch-sensitive region 124. The second light-turning arrangements 118, however, may be configured to substantially redirect light that strikes the second light-turning arrangements 118 from a direction substantially normal to the first side 112 such that the redirected light travels in a direction parallel to the first edge 104.

Also visible in FIGS. 1A and 1B are a plurality of light sources 120 that are distributed along the first edge 104 and the third edge 108. In some implementations, the light sources 120 may be located only along the first edge 104. Similarly, a plurality of light sensors 122 may be distributed along the second edge 106. Light sensors 122 may also be distributed along the fourth edge 110 in some implementations. Generally speaking, the light sources 120 may be distributed along at least one edge of the light guide (or at least configured to emit light into the planar light guide 102 along one edge), and light sensors 122 may be distributed along another, orthogonal edge (or at least configured to measure characteristics of light that reaches that other, orthogonal edge).

In operation, the touch sensor 100 may provide touch functionality by rapidly and cyclically illuminating a sequence of proper subsets of the light sources 120 and correlating such illuminations with measured characteristics of light detected by the light sensors 122.

Figure 1C:
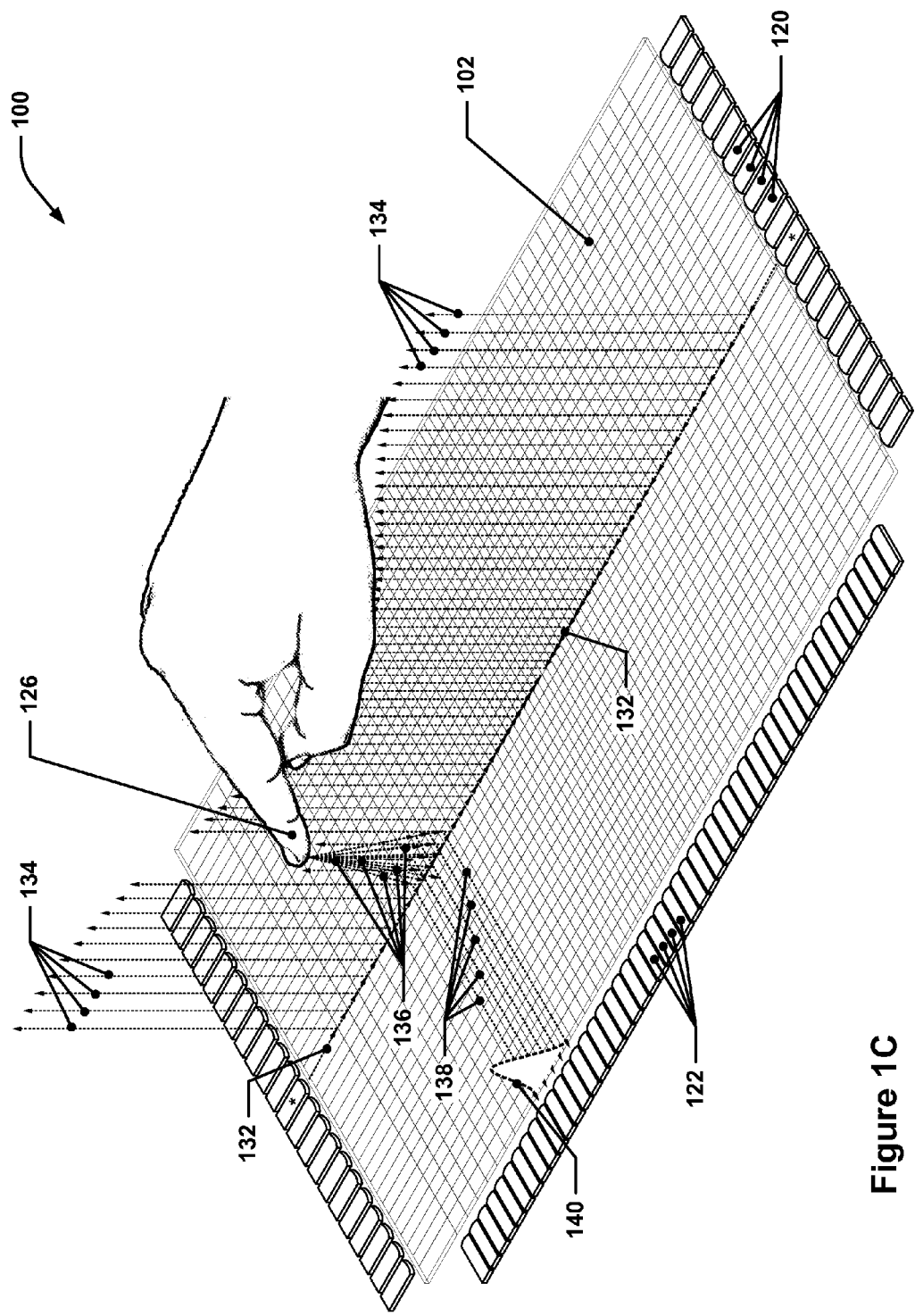
FIG. 1C depicts an isometric view of the example touch sensor of FIG. 1A with additional annotations showing the illumination of a proper subset of light sources.

FIG. 1C depicts an isometric view of the example touch sensor of FIG. 1A with additional annotations showing the illumination of a proper subset of light sources. As shown in FIG. 1C, a proper subset of two, opposing light sources 120 (marked with "*") has been illuminated. The emitted light 132 from the illuminated light sources 120 may travel into the first edge 104 and the third edge 108 of the planar light guide 102 and may then travel in a direction parallel to the second edge 106, e.g., directly or via total internal reflection (TIR). Light rays of the emitted light 132 that strike a first light-turning arrangement 116 may be redirected so as to pass out of the first side 112 of the planar light guide 102 as redirected light 134 in a direction substantially normal to the first side 112. The redirected light 134 may travel away from the first side 112 unimpeded. However, any of the redirected light 134 that strikes an object 126, such as a finger, may be reflected off the object 126 and back at the first side 112 of the planar light guide as reflected light 136. Any of the reflected light 136 that then re-enters the planar light guide 102 and strikes one of the second light-turning arrangements 118 may then be redirected in a direction substantially parallel to the first edge 104 and towards the second edge 106 (and/or the fourth edge 110, if light sensors are distributed along the fourth edge 110) as redirected reflected light 138. A characteristic or characteristics of the redirected reflected light 138 that reaches the second edge 106 may then be measured by the light sensors 122 that are located where the redirected reflected light 138 encounters the second edge 106.

In the depicted example, the light sensors 122 may measure the intensity of the redirected reflected light 138. Generally speaking, the intensity of the redirected reflected light 138 may be at a maximum at a location along the second edge 106 that corresponds with the location of the object 126 along the second edge 106. In FIG. 1C, such intensity is represented by an intensity curve 140 that shows a peak at a location along the second edge 106 that corresponds with the location of the object 126 along the second edge 106.

In the depicted example, each other opposing pair of light sources 120 may be separately illuminated as well and respective intensity measurements obtained from the light sensors 122. Each measured light intensity may be associated with the light sensor 122 that measured the light intensity and the light sources 120 that were illuminated when that light intensity was measured. The resulting light intensities may then be compared and one or more peak light intensities determined. The locations of the light sources 120 and light sensors 122 associated with the intensity peaks may then be used as a basis for determining the in-plane location of the object 126 with respect to the planar light guide 102. Thus, for example, if the first edge 104 is viewed as establishing an X axis and the second edge 106 is viewed as establishing a Y axis, the X location of the object 126 would be determined based on the X location of the light sources 120 that were illuminated when the peak intensity or intensities were measured, and the Y location of the object would be determined based on which light sensors 122 measured the peak intensities.

The magnitude of the peak intensities that are measured may be used to determine a Z-axis distance of the object. For example, the amount of reflected light 136 that reflects from the object 126 along a directed normal to the first side 112 may be at a maximum when the object 126 is in contact with the planar light guide 102 and may decrease in intensity as the object 126 moves further away from the first side 112. The redirected reflected light 138 may exhibit similar increases or decreases in intensity and thus the light intensity as measured by the light sensors 122 may allow the distance of the object 126 from the planar light guide 102 to be estimated.

The above discussion serves to illustrate the underlying principles of a touch sensor as conceived of by the inventors. Various further aspects of such touch sensors are discussed in more detail below.

Generally speaking, the light sources 120 are all located along edges of the planar light guide 102 that are orthogonal to edges of the planar light guide 102 along which the light sensors 122 are located so as to reduce or eliminate the chance that the light sensors 122 will detect light from the light sources 120 that has not first exited the first side 112 of the planar light guide 102 and then been reflected back in the planar light guide 102 by the object 126. This helps ensure that the light characteristics detected by the light sensors 122 are caused by the presence of the object 126 rather than by stray light that never exits the planar light guide 102 through the first side 112. In some implementations, all of the light sources 120 may be located along only a single edge, e.g., the first edge 104, and/or all of the light sensors 122 may be located along only a single edge, e.g., the second edge 106.

It is to be understood that there may be light sources other than the light sources 120, i.e., light sources that are not used in the touch/hover input-sensing techniques discussed herein, that may be located on along an edge of the planar light guide that is not orthogonal to the edge or edges of the planar light guide along which the light sensors 122 are located. For example, such other light sources may be used to provide visible light that is used to illuminate a display located underneath the touch sensor 100. Generally speaking, the light emitted by such other light sources may be discriminable from the light emitted by the light sources 120, e.g., the light emitted by the other light sources may have a different wavelength or the other light sources may be turned off while the light sources 120 are turned on. Similarly, there may be light sensors other than the light sensors 122, i.e., light sensors that are not used in the touch/hover input-sensing techniques discussed herein, that may be located on along an edge of the planar light guide that is not orthogonal to the edge or edges of the planar light guide along which the light sources 120 are located. For example, such other light sensors may include a photodetector for detecting the amount of ambient visible light that is present so that a display backlight may be automatically brightened or dimmed based on the ambient light levels that are measured by the other light sensors.

It is also to be understood that some implementations may include light sources 120 and light sensors 120 along the same or parallel edges of the planar light guide—however, in such implementations, only the light sources 120 along one edge or set of parallel edges would be illuminated at a time, and while those light sources 120 are illuminated, only light characteristic data from light sensors located along edges orthogonal to the one edge or parallel edges would be used to determine touch or hover input locations.

Thus, discussion herein to the effect that the light sources 120 and the light sensors 122 are located along orthogonal edges of the planar light guide 102 (or the like) is to be understood to refer to touch sensors in which the touch sensor is configured to only utilize light characteristic data from the light sensors 122 along an edge or edges orthogonal to the edge or edges along which light sources are illuminated in order to determine touch or hover input location.

The light sources 120 and the light sensors 122 that are used may be selected from a wide range of light sources and sensors, including those that operate in the visible light spectrum. In many implementations, however, the light sources may be selected so as to emit light in the non-visible spectrum, e.g., infrared (IR) or ultraviolet UV) light. Light sources that emit IR light in the 700 nm to 1000 nm wavelength range may allow the use of inexpensive silicon detectors for the light sensors and may thus be particularly well-suited for use in the touch sensors described herein. Of course, other sensor technologies and light source types may be used as well.

The light sources 120 and the light sensors 122 may be distributed along the edges of the planar light guide 102 in a variety of ways. Generally speaking, the placement of the light sources 120 is selected so as to cause light emitted from the light sources 120 to couple into the planar light guide 102 in a manner that promotes cross-guide travel of the emitted light 132 in a direction generally parallel to the second edge 106. The light sources 120 may be located such that the direction of maximum emitted light intensity is generally parallel to the planar light guide 102 and passes into the planar light guide 102 between the first side 112 and the second side 114 (this is similar to how the light sources 120 are arranged in FIGS. 1A through 1C).

In other implementations, however, the light sources 120 may be placed above or below the planar light guide 102. In such implementations, a localized light-turning arrangement in the periphery of the planar light guide 102 may cause the light emitted from the light sources 120 to be redirected such that it travels in a direction generally parallel to the first side 112 and perpendicular to the first edge 104.

The light sensors 122 may be arranged in a similar manner if desired.

The light sources 120 and the light sensors 122 may, in some implementations, be augmented with further refinements to enhance the directionality of the light that is emitted or detected, respectively, by the light sources 120 and the light sensors 122. For example, a mask or an array of lenses may be interposed between the light sources 120 and the planar light guide 102 that collimates light emitted from the light sources (or at least screens out emitted light that deviates more than a small angle from a nominal centerline of each light source) such that the emitted light 132 that crosses the planar light guide 102 travels along paths that are substantially parallel to the second edge 106. Similarly, masks or lenses may be interposed between the light sensors 122 and the planar light guide 102 to screen out redirected reflected light 138 that is not substantially orthogonal to the second edge 106.

It is to be understood that while the emitted light 132, the redirected light 134, the reflected light 136, and the redirected light 138 are generally indicated in FIG. 1C as traveling along paths that correspond with mutually orthogonal directions (with the exception of the reflected light 136, which is shown as travelling along a plurality of directions), in actual practice, the emitted light 132, the redirected light 134, the reflected light 136, and the redirected light 138 may travel along a plurality of different directions. It is to be understood that the emitted light 132, the redirected light 134, the reflected light 136, and the redirected light 138 may generally have directions of maximum intensity that are substantially orthogonal to one another.

The ability of the touch sensor to determine accurate positional information regarding objects touching or hovering over the planar light guide may be degraded by ambient light that may enter the planar light guide in a manner similar to how the redirected reflected light enters the planar light guide. Such ambient light may inject noise into the light characteristics measured by the light sensors, and may result in false peaks being detected (or may "wash out" measured peaks to such an extent that it becomes difficult or impossible to accurately identify the peaks that result from the redirected reflected light). Various techniques and technologies may be used to allow the light emitted by the light sources and reflected back into the planar light guide to be differentiated from such ambient light. For example, the light emitted by the light sources may be modulated at a particular frequency or using a particular signal pattern and the light sensor circuitry may include an active or passive band-pass filter or correlator to the signal pattern in order to filter out ambient light.

Generally speaking, a touch sensor such as the touch sensor 100 requires at least two light sources 120 and at least two light sensors 122 in order to be able to provide an indication of a touch or hover input's location. As the number of light sources 120 and the number of light sensors 122 of a touch sensor 100 increases, the touch input resolution of the touch sensor 100 may correspondingly increase. For example, a 55 mm×100 mm touch sensor, which is about the size of a typical smartphone touchscreen, may, in some implementations, include 22 light sources 120 distributed along the first edge 104 and another 22 light sources 120 distributed along the third edge 108 (the first edge 104 and the third edge 108, in this case, may correspond to the 55 mm dimension) and may include 50 light sensors, e.g., photodetectors, distributed along the second edge 106 and another 50 light sensors distributed along the fourth edge 110 (the second edge 106 and the fourth edge 110 may correspond, in this case, to the 100 mm dimension). In the 55 mm×100 mm example above, the pitch of the light sources 120 may be approximately 2.5 mm, and the pitch of the light sensors 122 may be approximately 2 mm. The arrangement of light sources 120 and light sensors 122 described above with respect to the 55 mm×100 mm example may provide a touch input resolution of ±2 mm in the XY plane, i.e., the nominal plane of the planar light guide 102.

Figure 2:
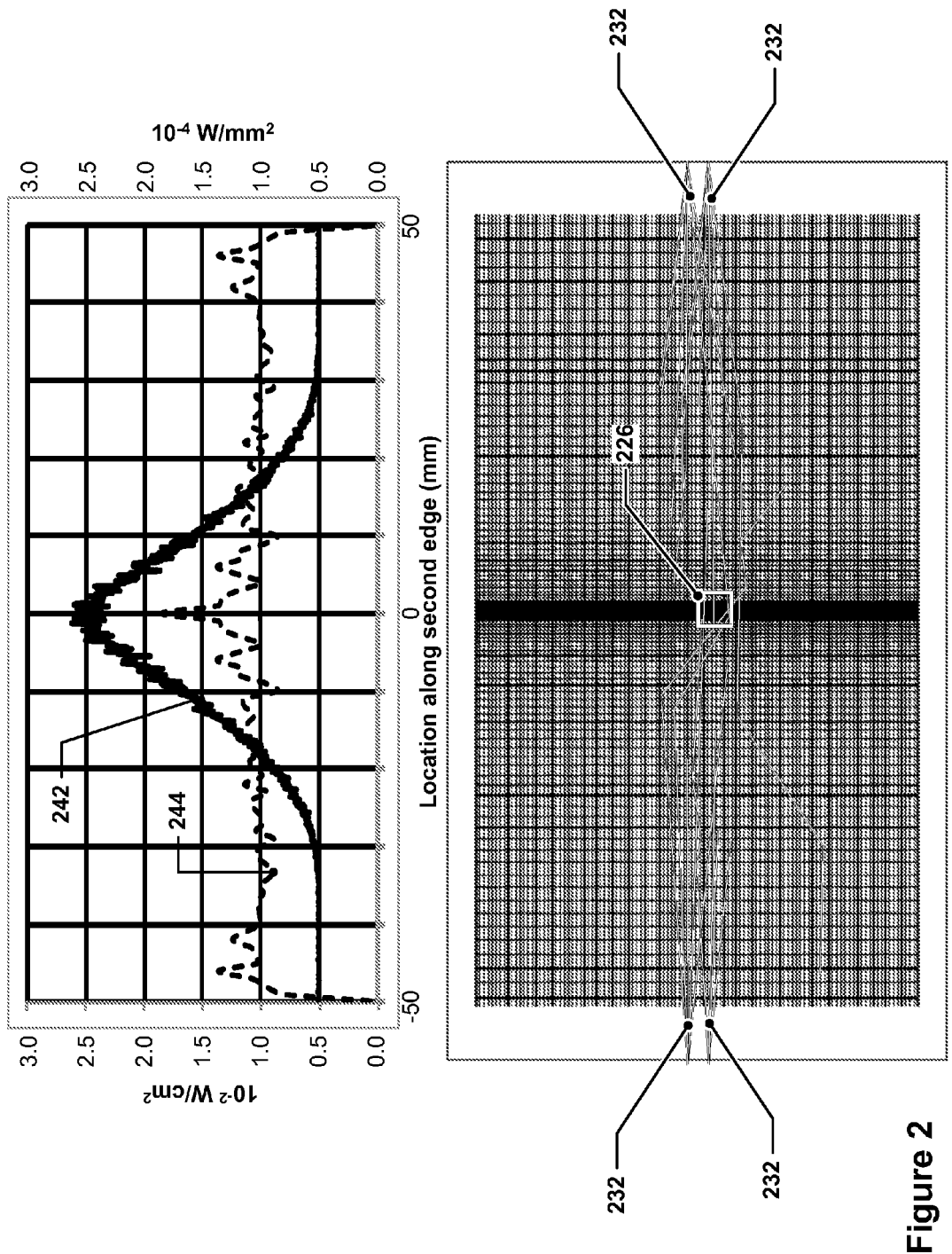
FIG. 2 depicts data from a simulation that shows the irradiance measured along the second edge and the fourth edge of a planar light guide as a result of a touch input.

In some implementations, touch input resolution may be enhanced by performing curve fitting or interpolation on data points gathered by the light sensors 122. For example, curve fitting may be used to reduce or mitigate the effects of signal noise on a touch input determination. FIG. 2 depicts data from a simulation that shows the irradiance measured along the second edge and the fourth edge of a planar light guide as a result of a touch input.

In FIG. 2, a planar light guide 202 is depicted. The planar light guide 202 has first light-turning arrangements 216 that are spaced apart using a symmetric "chirp" pattern (described in more detail below), and second light-turning arrangements 218 that are spaced apart in a regular repeating fashion. In the example of FIG. 2, emitted light 232 is shown radiating outwards from 2 opposing pairs of light sources located approximately midway along a first edge 204 and a third edge 208. The emitted light 232 shown does not represent the sum total of all light emitted from the illuminated light sources 220, but is only a sampling of light paths followed by some light emitted from the illuminated light sources 220. The emitted light 232 does, however, demonstrate the general trend of the emitted light 232 to travel in a direction generally parallel to the second edge 206. Redirected light, reflected light, and redirected reflected light are not depicted in this example. An object 226 (represented by a square) is touching or hovering above the planar light guide 202 at the center of the planar light guide 202.

Data plot 242 depicts irradiance (units of $10^{-2}$ W/cm$^2$) measured along the second edge 206 and the fourth edge 210 as a function of distance along the second edge 206/fourth edge 210. As can be seen, there is irradiance fall-off on either side of the location where the object 226 is located that is gradual (as opposed to being a step function). The irradiance fall-off is due to the fact that some of the light, e.g., the reflected light, may travel in directions that are non-orthogonal, e.g., there may be some diffuse reflected light that is reflected off of the object 126 that has a decreasing magnitude with decreasing distance between the object 126 and an axis that is perpendicular to the second edge 206 and that intersects the point where the diffuse reflected light strikes the planar light guide 202. By performing a curve-fit to the measured light characteristic data, a more accurate indication of where a touch input is located may be obtained.

The first light-turning arrangements 116 and the second light-turning arrangements 118 may be selected from a wide variety of different types of light-turning arrangements, including, but not limited to, holographic, diffractive, refractive, or reflective (including total-internal-reflection, or TIR) features. In some implementations, multiple types of light-turning arrangements may be used for the first light-turning arrangements 116 and/or for the second light-turning arrangements 118.

Generally speaking, the light-turning arrangements selected for the first light-turning arrangements 116 and the second light-turning arrangements 118 may be selected based on their general suitability for accomplishing their respective light redirection behaviors discussed above. It is to be understood that some light-turning arrangements may redirect some, but not all, light that strikes the light-turning arrangements from a particular direction, and that such light may be redirected in a number of different directions. Thus, when a light-turning arrangement is referred to as "redirecting" light in a particular direction, it is to be understood that the light-turning arrangement may also redirect light in other directions with lesser intensity.

Figure 3:
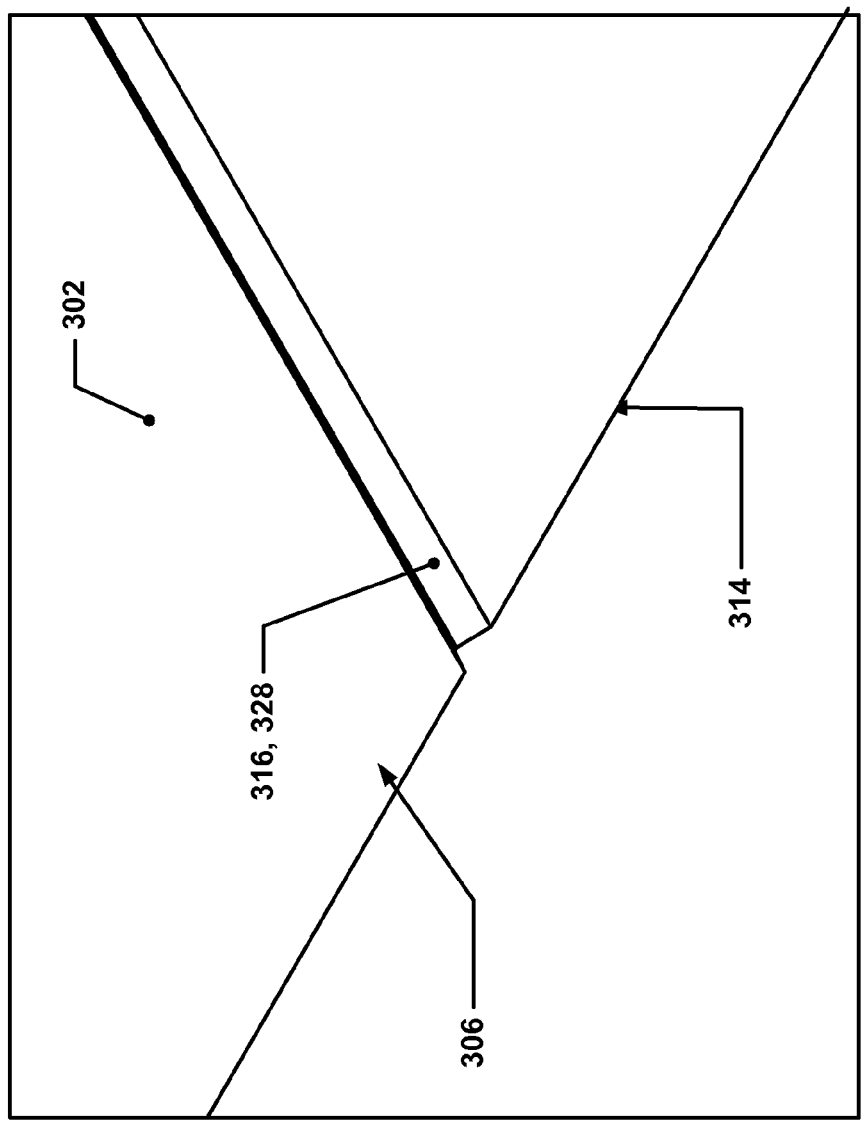
FIG. 3 depicts an isometric detail view of an example light-turning arrangement.

FIG. 3 depicts an isometric detail view of an example light-turning arrangement. In FIG. 3, a first light-turning arrangement 116 is shown in detail. As can be seen, the first light-turning arrangement shown in this example is a substantially V-shaped groove. In the depicted example first light-turning arrangement, the V-shaped groove has an included angle of approximately 94°, a depth of 10 μm, a bottom width of 2 μm, and a top width of approximately 22-23 μm (in this case, the V has a flat bottom as sharp, acute edges are difficult to manufacture reliably). Such first light-turning arrangements may, for example, cause light that is directed into the first edge 104 along a path that is substantially parallel to the second edge 106 to be redirected such that a significant portion of the redirected light that passes through a point located above the first side 112 may travel within a cone having an aperture of, for example, between 24° and 30°. Other light-turning arrangements that may provide for even more directionality in the redirected light may also or alternatively be used.

The planar light guide 102 may be made by a variety of techniques including, but not limited to, thermal embossing of plastic, ultraviolet embossing of plastic, injection molding, etc.

The light-turning arrangements may be distributed across the touch-sensitive region 124 in variety of ways. For example, the first light-turning arrangements 116 and/or the second light-turning arrangements 118 may be distributed in a substantially even manner (as is the case with the depicted second light-turning arrangements 118 shown in FIGS. 1A and 1B). Such evenly-spaced light-turning arrangements may, however, result in uneven illumination or redirection. For example, as light travels from the first edge 104 towards the third edge 108, less and less light may be redirected out of the planar light guide 102 by the first light-turning features 116. As a result, the intensity of redirected light that exits the first side 112 may decrease with increasing distance from the first edge 104.

Alternative distributions of light-turning arrangements that may be used in a light sensor as described herein may include "chirp" or gradient distributions. In either of these distributions, the spacing between adjacent light-turning arrangements or sets of light-turning arrangements may be increasingly reduced along the axis along which the light-turning arrangements are distributed, i.e., along the second edge 106 for the first light-turning arrangements 116 and along the first edge 104 for the second light-turning arrangements 118. In some implementations, such distributions may be symmetric, e.g., two chirp patterns may be used, each starting from a different opposing edge and each decreasing in spacing as it approaches, for example, a centerline of the planar light guide 102. Such a symmetric chirp spacing pattern is depicted in the planar light guide 102.

Chirp or gradient spacing may provide a physical compensation mechanism that adjusts for fall-off in the redirected light 134 that may exit the planar light guide 102. By increasing the frequency with which first light-turning arrangements 116 are encountered as distance from a light source 120 increases, the attenuation experienced by the emitted light 132 may be offset by increased opportunity for the emitted light 132 to exit the planar light guide 102 as redirected light 134 via a first light-turning arrangement 116. As a result, it may be possible to attain a more uniform irradiance of redirected light 134 across the planar light guide 102 than may be achievable with fixed-spacing first light-turning arrangements. For example, in FIG. 2, the irradiance through the first side as a function of position along the second edge is plotted as irradiance plot 244. As can be seen, the irradiance (units of $10^{-4}$ W/cm$^2$) is largely between 1.0 and 1.5 and is relatively uniformly distributed.

Although the above discussion has focused on chirp spacing with respect to the first light-turning arrangements 116, chirp or gradient spacing may also be used with the second light-turning arrangements 118 in order to compensate for attenuation of the redirected reflected light 138 within the planar light guide 102. By increasing the frequency of occurrence of second light-turning arrangements 118 as distance from the light sensors 122 increases, a greater percentage of reflected light 136 that enters the planar light guide 102 at locations that are more remote from the light sensors 122 may be redirected as redirected reflected light 138. This may offset increased attenuation of such redirected reflected light 138 as compared with redirected reflected light 138 that results from reflected light 136 that enters the planar light guide 102 at locations closer to the light sensors 122.

Such attenuation may alternatively be compensated by apodization or precompensation-scaling of light source output. For example, the subset of light sources 120 further away from the light sensors 122 can be powered with higher light intensity than the subset of light sources 120 that is closer to light sensors 122. The lower propagation efficiency of the redirected reflected light 138 may thus be compensated for by higher illumination and thus higher reflected light 136. In this way a more uniform collection efficiency across the touch-sensitive region 124 may be achieved.

Such attenuation may alternatively or additionally be compensated for through adjusting the gain or amplification of the light sensors 122. For example, light sensors 122 that are located closer to the light sources 120 may have a lower gain or amplification than light sensors 122 that are located further from the light sources 120.

In some implementations, the first light-turning arrangements 116 and/or the second light-turning arrangements 118 may be spaced apart in a randomized pattern to reduce visual artifacts, such as Moiré patterns. Another alternative or additional technique for reducing similar visual artifacts is to randomize the dimensions of features in the first light-turning arrangements 116 and/or the second light-turning arrangements 118.

Redirected light 134 uniformity may affect the accuracy of Z-axis measurements. The more uniform the redirected light 134 uniformity is across the planar light guide 102, the less Z-axis measurements of touch inputs may be affected by the XY location of the touch input. If Z-axis measurement of touch inputs is not desired or not implemented, then such uniformity may be of lesser concern.

Generally speaking, the spacing of the first light-turning arrangements 116 and the second light-turning arrangements 118 may be on the order of microns to millimeters, e.g., 200 microns to 2 mm.

The first light-turning arrangements 116 and the second light-turning arrangements 118 may be located in a variety of different locations within the planar light guide 102. For example, in the depicted example, the first light-turning arrangements 116 and the second light-turning arrangements 118 are all located on the second side 114 of the planar light guide 102. In other implementations, one or both of the first light-turning arrangements 116 and the second light-turning arrangements 118 may be located on the first side 112 or in locations between the first side 112 and the second side 114.

Figure 4:
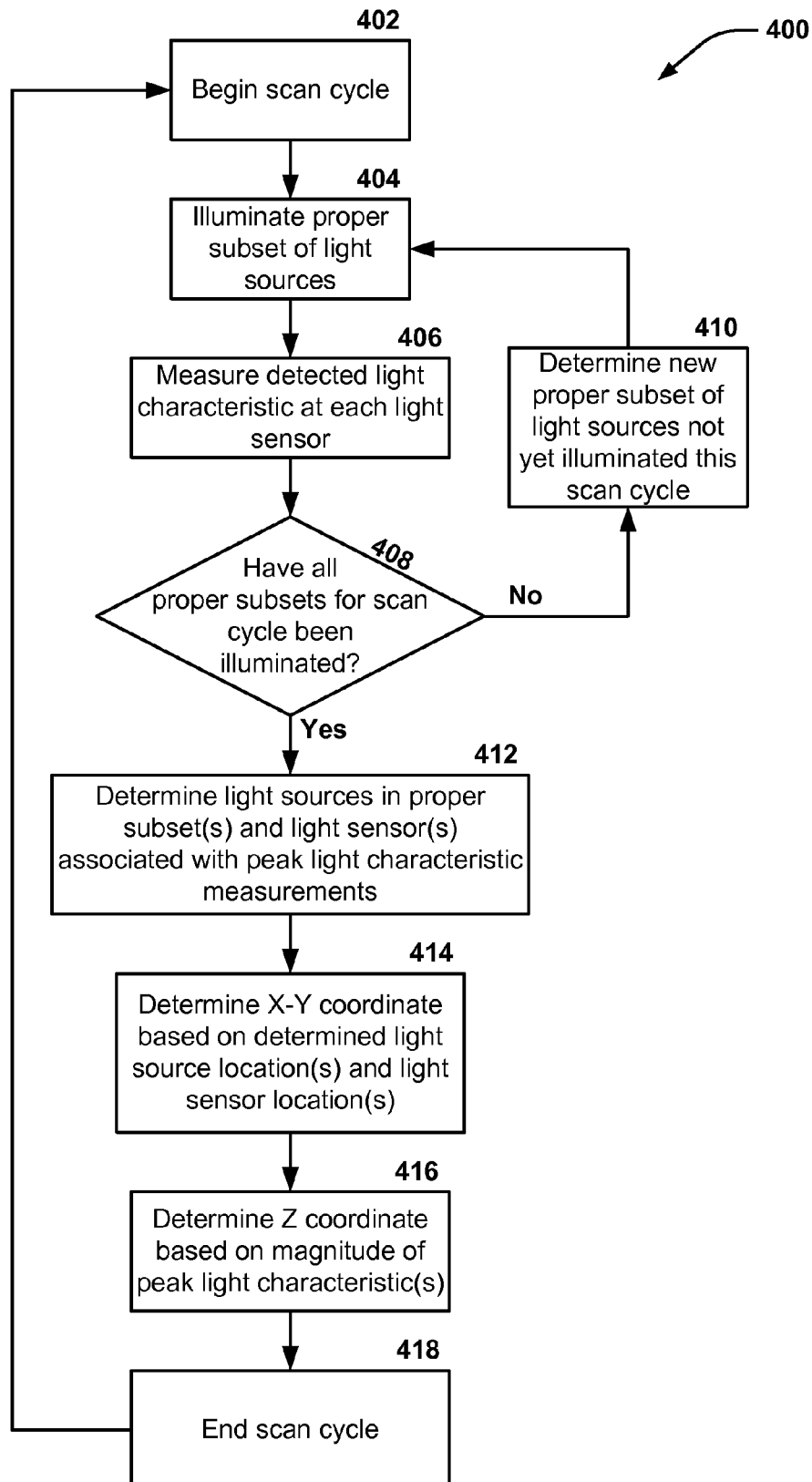
FIG. 4 depicts a flow chart showing various elements of a technique for using a time-sequential touch sensor.

FIG. 4 depicts a flow chart showing various elements of a technique for using a time-sequential touch sensor. A time-sequential touch sensor such as those discussed herein may often be operated in a continuously-scanning (or rapid intermittent scan) mode to allow a user's touch or hover input motions to be tracked. However, a time-sequential touch sensor may also be operated in a single-scan mode (or at a scan frequency that is sufficiently low enough that rapid motions of a person's finger may not be accurately tracked) in some implementations. Regardless of in what mode a time-sequential touch sensor is operated, the time-sequential touch sensor may perform a plurality of operations as outlined in FIG. 4.

The technique outlined in FIG. 4 may begin with the start of a scan cycle in block 402. A scan cycle, as used herein, refers to operations performed by a time-sequential touch sensor in order to obtain XY or XYZ coordinates (one or multiple) associated with a single, relatively short, time window. In block 404, a proper subset of light sources distributed along a first edge (and/or a third edge) of a planar light guide of a time-sequential touch sensor may be illuminated. A proper subset is a subset of a set that does not include all of the elements of the set. While all of the light sources of a time-sequential touch sensor may be illuminated in this step, this may not produce data that may be used to calculate XYZ coordinates. For example, it may be desirable to illuminate all of the light sources of a time-sequential touch sensor in order to determine if there is any touch input at all. If a touch or hover input is detected, then the technique of FIG. 4 may be used to determine the touch or hover input's location.

In block 406, data regarding one or more light characteristics may be collected from a plurality of light sensors distributed along a second edge (and/or a fourth edge) of the planar light guide while the light sources are illuminated. In most implementations, the data regarding the one or more light characteristics may be collected from all of the light sensors used to collect data for XYZ touch or hover input determination un block 406. In other implementations, however, a subset of light sensors may be used, e.g., in a low-power mode, every other light sensor may be used to provide lower-resolution touch or hover sensing capability. The data regarding one more light characteristics that is collected from the light sensors may be stored in a memory in a manner that allows for the magnitude of the light characteristic data as a function of location along the second edge and/or fourth edge to be determined for each proper subset.

In block 408, a determination is made as to whether all proper subsets of light sources for the scan cycle have been completed. The number and composition of proper subsets of light sources for a scan cycle may be fixed, or may, in some implementations, be variable.

For example, a scan cycle may involve proper subsets that each include only one light source (or one pair of opposite-facing light sources). In such an implementation, the number of proper subsets may be equal to the number of light sources or opposing pairs of light sources. Other implementations, however, may involve more complex proper subsets. For example, proper subsets may be used that form a Gray code pattern, as discussed in more detail later in this disclosure with respect to FIG. 5.

If all proper subsets of light sources for a scan cycle have been illuminated, the technique may proceed to block 412. If all proper subsets of light sources for a scan cycle have not been illuminated, however, the technique may proceed to block 410, where a new proper subset of light sources not yet illuminated during the current scan cycle may be determined. While a new proper subset of light sources that has already been illuminated during the current scan cycle may be determined in block 410, such a proper subset would be redundant of the earlier illumination of the proper subset in question with respect to the scan cycle and would thus generally be superfluous and a waste of power and computing resources. After determining the new proper subset of light sources, the technique may return to block 404, where the new proper subset of light sources may be illuminated.

As discussed above, once a determination is made in block 408 that all proper subsets of light sources for the current scan cycle have been illuminated, the technique may proceed to block 412. In block 412, a determination may be made as to which light characteristic data sets obtained during the scan cycle have peak light-characteristic measurements. Such peak light-characteristic measurements may, for example, be determined as being any light-characteristic measurement that exceeds a threshold that is set above the expected noise level for the system, or that is above a threshold that is higher than the expected light characteristic or characteristics of redirected reflected light that the light sensors may measure based on redirected reflected light that reflects off an object more than a predefined distance away from the time-sequential touch sensor. In some implementations, one or more light characteristic data sets for the scan cycle may be identified as having light characteristic peaks. In other implementations, the number of light characteristic peaks that are identified in block 412 may be restricted to a fixed number, e.g., 1, 2, 3, etc. This may allow for single-input touch sensing (in which only the maximum peak may be identified) and multi-touch input sensing (in which two or more highest-valued peaks may be identified).

The peak detected light characteristics may correspond to locations where the light characteristics of the reflected light that strikes the planar light guide are strongest or of highest magnitude. The light characteristics in question may, for example, be a light intensity characteristic, e.g., irradiance or illuminance. In some implementations, the signals may also be representative of other characteristics, including polarization, directionality, color, frequency, amplitude, amplitude modulation, and/or other properties of light.

Once the light characteristic datasets having the peaks identified in block 412 are determined, XY coordinates may be determined in block 414 for each peak identified. The XY coordinates may be determined, for example, by mapping the light source or sources that were illuminated when the light characteristic dataset having the peak was detected to an X location and then mapping the light sensor or sensors that detected the peak to the Y location (since the orientation of the XYZ coordinate system may be defined as desired, the light source may also, for example, be mapped to the Y location and the light sensor may be mapped to the X location). The resulting mappings may determine the XY location of the peak, and consequently, due to the construction of the planar light guide used in the time-sequential touch sensor and as outlined herein, the XY location of the object that produced the reflected light that caused the peak.

The technique may then proceed to block 416 for determination of a Z-axis coordinate for the touch input. The Z-axis coordinate or coordinates may be determined by evaluating the magnitude or magnitudes of the peak or peaks associated with the XY coordinate or coordinates. For example, the closer an object is to the planar light guide, the more reflected light will reflect off of the object and back into the planar light guide, resulting in a large magnitude peak associated with the object's XY position. Based on the magnitude of the peak, a Z-axis distance of the object from the planar light guide may be calculated or otherwise determined. For example, it may be determined experimentally that a magnitude of X light intensity units corresponds with a distance of 1", and that 0.5X light intensity units corresponds with a distance of 2". In some implementations, it may not be possible to determine absolute distance of the object from the planar light guide, although it may be possible to determine various other characteristics of the object's position or movement with respect to the planar light guide. For example, it may be determined that the object is moving closer to or further from the planar light guide based on whether the measured light characteristic for the XY location of the object is increasing or decreasing, respectively, from scan cycle to scan cycle. The relative Z-axis positioning of multiple detected objects may also be determined. For example, if two peaks are detected at different XY locations, the peak with the higher magnitude may be interpreted as representing an object that is closer to the planar light guide than another object associated with the remaining peak.

Block 416 may also adjust the Z location based on the XY location. For example, if the distribution of redirected light that exits the planar light guide is known to be non-uniform in a quantifiable way, then the magnitude of the measured light characteristic associated with each XY location may be adjusted to factor in the non-uniformity. Thus, if it is known that twice as much redirected light exits the planar light guide at the edge adjacent to the light sources than at the center of the planar light guide, light characteristic magnitudes measured by light sensors at the center of the second edge of the planar light guide may be doubled as compared with light characteristic magnitudes measured by light sensors adjacent to the first edge of the planar light guide. Similarly, if it is known that a given amount of reflected light per unit area that enters the planar light guide at a particular XY location suffers increased attenuation as it travels towards the light sensors as compared with the attenuation experienced by a given amount of reflected light per unit area that enters the planar light guide at another XY location, such attenuation may be compensated for by multiplying or dividing the measured light characteristic associated with that XY location by an appropriate compensation factor. Such compensation factors may be calculated and pre-set based on experimental or simulation data, or may be able to be dynamically recalibrated. For example, the time-sequential touch sensor may be placed in a calibration mode and the planar light guide then placed against (or slightly offset from) a flat material that has a substantially uniform reflectance and color, e.g., a white piece of cardstock. The time-sequential touch sensor may then perform a scan cycle and obtain a data set of measured light characteristics that represent substantially identical touch inputs at every location of the planar light guide. In theory, the measured light characteristics obtained from such a calibration scan cycle should be substantially identical across the touch region of the planar light guide. In practice, however, the measured light characteristics may vary across the touch region due to intra-light guide attenuation. A plurality of gain factors may be calculated each calculated gain factor applied to the light characteristic magnitude associated with each different XY location such that the gain-adjusted light characteristic magnitudes for the flat calibration material are all substantially the same value. These same gain factors may then be applied to the light characteristic magnitudes associated with each XY location during normal, non-calibration use of the time-sequential touch sensor.

If Z-axis distance of a touch input is not required, then block 416 may be omitted. After determining XY or XYZ location or locations of a touch input or touch inputs, the technique may proceed to block 418, which completes the scan cycle. The XY or XYZ location may be reported out to an external device (or retained for future reference), and the technique may return to block 402 to perform another scan cycle. The technique may also pause before starting another scan cycle if a high sample rate is not required.

The various actions and operations performed as part of an individual scan cycle as outlined in FIG. 4 do not necessarily have to be performed in the order shown. For example, in some implementations, the Z-coordinate may be calculated prior to the XY coordinate. In a further example, in some implementations, an XY location of a touch input (or the presence of a touch input) may be determined prior to determining the next proper subset of light sources to be illuminated (see the Gray coding example discussed below).

The discussion above has primarily discussed proper subsets that each contain only one or two light sensors. In the 55×100 mm example discussed earlier, use of single light source or single light source pairs as proper subsets would mean that each scan cycle would require 22 separate proper subsets to be illuminated. In effect, this performs a raster scan of the touch sensitive region, although it is not necessary for the light sources to be illuminated in sequence—they may be progressed through in a random or otherwise-determined non-repeating order within each scan cycle. However, other implementations may utilize other types of proper subsets to complete a scan cycle using fewer proper subsets to achieve the same resolution. An example of such an implementation may be found in the use of proper subsets that produce illumination patterns that are similar to "Gray" codes typically used for error prevention when reading naturally-occurring binary codes.

FIG. 5 depicts a Gray code pattern example. In the depicted example, the time-sequential touch sensor used has 32 light sources along a first edge. Only 5 different proper subsets are needed in a scan cycle in this example in order to determine an XY touch location. These five proper subsets are referred to in FIG. 5 as the first, second, third, fourth, and fifth patterns. The 32 light sources are each represented by a corresponding row in FIG. 5 representing their corresponding relative physical positioning along the first edge of the planar light guide of the time-sequential touch sensor that is the subject of this example.

In each of the patterns, the number of illuminated light sources as compared with the number of non-illuminated light sources may be substantially equal, e.g., 16 light sources in each pattern in this example may be illuminated and 16 light sources may be dark—if an odd number of light sources exists, then the odd light source out may be illuminated or kept dark from proper subset to proper subset.

In the first pattern, the illuminated light sources may be clustered into one contiguous block and the dark light sources may be clustered together into another contiguous block. Thus, redirected light will pass through approximately one half of the first side of the planar light guide, and the remaining half of the planar light guide will be substantially "dark." In the context of the Gray code discussion herein, it is to be understood that "contiguous" refers to light sources that are adjacent to one another (although not necessarily part of the same light source structure and not necessarily touching each other).

In the second pattern, the illuminated light sources may again be clustered into one contiguous block, but the dark light sources may be divided into two substantially equally-sized blocks of contiguous light sources. The illuminated light sources may thus be bracketed between the two equally-sized blocks of dark light sources.

In the third pattern, the illuminated light sources may be clustered into two substantially equally-sized blocks of contiguous light sources. Each block of the illuminated light sources may be substantially centered on the adjacent light sources that formed transitions between the illuminated light sources and the dark light sources in the second pattern. The remaining light sources may be the dark light sources of the third pattern.

In the fourth pattern, the illuminated light sources may be clustered into three substantially equally-sized blocks of contiguous light sources. Each block of the illuminated light sources may be substantially centered on the adjacent light sources that formed transitions between the illuminated light sources and the dark light sources in the third pattern. The remaining light sources may be the dark light sources of the fourth pattern.

In the fifth pattern, the illuminated light sources may be clustered into eight substantially equally-sized blocks of contiguous light sources. Each block of the illuminated light sources may be substantially centered on the adjacent light sources that formed transitions between the illuminated light sources and the dark light sources in the fourth pattern. The remaining light sources may be the dark light sources of the fifth pattern.

In some implementations, a sixth pattern that is the inverse of the fifth pattern may also be illuminated, although there may be marginal benefit to doing so.

During the illumination of each pattern/proper subset in the example above, the light characteristic that is measured by each light sensor may be monitored. The location along the first edge (the edge along which the light sources are distributed) of a touch input may be determined by observing during which patterns/proper subsets the peaks indicating the touch input are observed. For example, if light characteristic peaks are detected by a particular light sensor during the second and third patterns but not during the first, fourth, and fifth (and sixth, if used) patterns of a scan cycle, then this correlates with the $9^{th}$ light source. Similarly, if light characteristic peaks are detected by a particular light sensor during the first, second, third, and fifth patterns but not during the fourth (and sixth, if used) patterns of a scan cycle, then this correlates with the $23^{rd}$ light source.

The sixth pattern may be needed in some cases to verify whether or not a scan cycle that does not produce any light characteristic peaks represents a scenario where there is no touch input to detect or a scenario where there is a touch input to detect but the touch input correlates with a light source that is never turned on, e.g., the $1^{st}$ light source in FIG. 5. The sixth pattern may be avoided, in this case, if a touch input correlating with the $1^{st}$ light source also results in a partial peak when the $2^{nd}$ light source is active—although it may be difficult to tell if the touch input is associated with the $1^{st}$ light source location or the $2^{nd}$ light source location. Another way of dealing with the permanently-off light source is to use an odd number of light sources and ensure that the extra light source is included in the illuminated light sources of the first pattern.

Such Gray code implementations may allow for a much more efficient scanning for XY or XYZ position within each scan cycle. For example, in the time-sequential touch sensor of FIG. 5, XYZ position may be obtained with 5 proper subsets as opposed to 30+ proper subsets as may be used in a raster scan XY or XYZ determination.

If a Gray code implementation is used in a single-touch context, i.e., only one touch location is expected or processed at a time, a further benefit of a Gray code implementation is that the Grey code patterns/proper subsets may be modified on the fly to reduce power consumption. For example, if a peak is detected during illumination of one of the proper subsets of a Gray code, the remaining proper subsets that may be displayed during that scan cycle modified to avoid illuminating light sources that could not further assist in refining the XY location associated with the peak. For example, light sources other than those illuminated in the proper subset that produced the peak may be kept dark in subsequent proper subsets that are illuminated during the scan cycle in question.

The Gray code example provided above may be more generally described as follows. The first proper subset/pattern may have a first contiguous block of first light sources and a second contiguous block of second light sources. The first light sources and the second light sources may each include approximately half of the light sources of the time-sequential touch sensor.

The second proper subset/pattern may have a first block of contiguous first light sources and two second blocks of contiguous second light sources. The first light sources and the second light sources may each include approximately half of the light sources and the two second contiguous blocks may each include substantially equal numbers of the second light sources.

The third through Nth proper subsets/patterns may each have a plurality of first blocks of contiguous first light sources and a plurality of second blocks of contiguous second light sources. Each third through Nth proper subset may have first contiguous blocks each including a quantity of first light sources that is approximately half of the quantity of first light sources in each of the first contiguous blocks of the proper subset ranked one level higher. Moreover, each first block of each third through Nth proper subset may be substantially centered on the first light sources at either end of the first block or first blocks (or the transitions between the first blocks and the second blocks) of the proper subset ranked one higher. Furthermore, the second blocks of each third through Nth proper subset may be formed by the light sources not included in the first blocks of that third through Nth proper subset. Finally, the first through Nth proper subsets may each be illuminated by causing either the first light sources for all of the first through Nth proper subsets to be illuminated while the second light sources for all of the first through Nth proper subsets are dark or the second light sources for all of the first through Nth proper subsets to be illuminated while the first light sources for all of the first through Nth proper subsets are dark.

It is to be understood that the discussion above with respect to the ordinal indicators/rankings of "first," "second," "third," . . . "Nth" are used as a way of describing the structure of the proper subsets with respect to other proper subsets that may be part of a scan cycle. The proper subsets of a scan cycle may, of course, be illuminated in an order other than the order implied by the ordinal indicators, and such illumination sequences are to be understood as also being within the scope of this disclosure.

The above techniques may be practiced, at least in part, using components similar to those described above with respect to FIGS. 1A through 1C. In practice, such components may be augmented by other components to produce a functional product.

Figure 6:
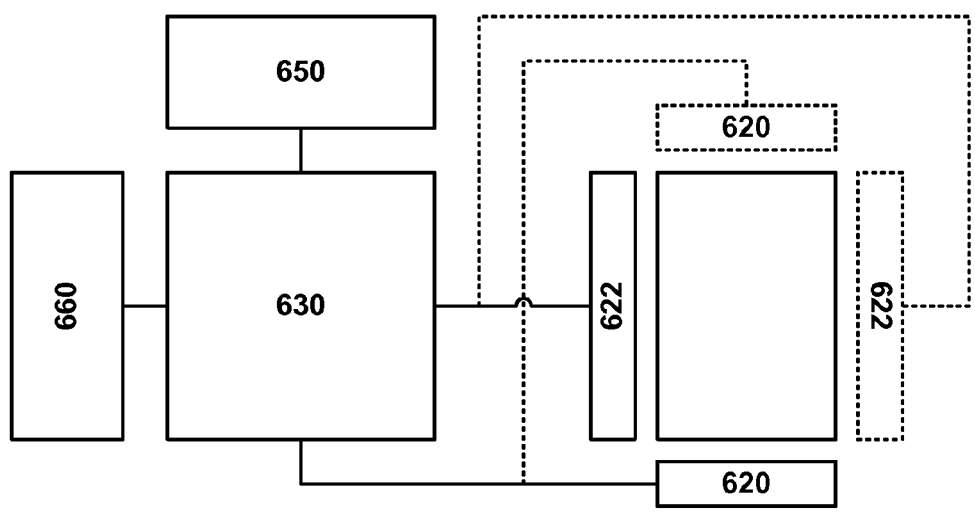
FIG. 6 depicts a high-level schematic of an example touch sensor.

FIG. 6 depicts a high-level schematic of an example touch sensor. A touch sensor 600 is shown. The touch sensor 600 may include a planar light guide 602 and may have light sources 620 distributed along a first edge of the light guide and light sensors 622 distributed along a second edge of the light guide 602. In some implementations, there may also be light sources 620 distributed along a third edge of the light guide and light sensors 622 distributed along a fourth edge of the light guide 602 (shown in dotted lines).

A controller 630 may be communicatively connected with the light sources 620 and the light sensors 622 such that the controller may control which light sources are illuminated and which light sources are dark. The controller 630 may be able to address each light source separately, thus allowing each light source to be independently switched between an on and off state. The controller 630 may also be able to receive light characteristic data from the light sensors 622 at least while any of the light sources 620 are illuminated. The light characteristic data may be stored in memory 650. The controller 630 may include one or more processors, as well as potential signal conditioning circuitry for filtering, smoothing, or otherwise facilitating analysis of the light characteristic data. The controller 630 may also interact with an input/output interface 660 that may allow the controller 630 to communicate with an external device, e.g., send XYZ positional data to a cell phone processor or tablet processor. The memory 650 may also store computer-executable instructions for controlling the controller to perform methods in accord with those described earlier in this disclosure.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations can be selectively combined to provide one or more comprehensive, but slightly different, technical solutions. It will therefore be further appreciated that the above description has been given by way of example only and that modifications in detail may be made within the scope of this disclosure.

What is claimed is:

1. An apparatus comprising:
a substantially planar light guide having a first edge, a second edge, a first side, and a second side, wherein:
   the first side and the second side are substantially planar and substantially parallel to one another,
   the first edge and the second edge are both substantially parallel to the first side and to the second side,
   the first edge and the second edge are substantially orthogonal to one another, and
   the substantially planar light guide includes:
      a plurality of first light-turning arrangements distributed across a touch-sensitive region of the substantially planar light guide, each first light-turning arrangement configured to substantially redirect light that strikes the first light-turning arrangement from a direction that is parallel to the second edge such that the redirected light travels out of the light guide in a direction substantially normal to the first side, and
      a plurality of second light-turning arrangements distributed across the touch-sensitive region of the substantially planar light guide, each second light-turning arrangement configured to substantially redirect light that strikes the second light-turning arrangement from a direction substantially normal to the first side such that the redirected light travels in a direction parallel to the first edge;
a plurality of light sources located along the first edge;
a plurality of light sensors located along the second edge;
a controller having at least one memory and at least one processor communicatively connected with the light sources, the light sensors, and each other, the at least one memory storing computer-executable instructions for controlling the at least one processor to:
   cause a proper subset of the light sources to be illuminated to produce a Gray code pattern at a first time,
   obtain a signal representative of a characteristic of received light from the light sensors in association with the illumination of the proper subset of the light sources at the first time,
   determine, based on the signal, which one or more light sensors detected a first magnitude of light, and
   determine, based at least in part on the one or more light sensors that detected the first magnitude of light and the light sources in the proper subset of the light sources, an input location relative to the light guide.

2. The apparatus of claim 1, further comprising:
a display, wherein the substantially planar light guide is overlaid on the display.

3. The apparatus of claim 1, wherein the first light-turning arrangements and the second light-turning arrangements are selected from the group consisting of: holographic light-turning arrangements, diffractive light-turning arrangements, refractive light-turning arrangements, reflective light-turning arrangements, total-internal-reflection light-turning arrangements, and combinations thereof.

4. The apparatus of claim 1, wherein the first light-turning arrangements, the second light-turning arrangements, or the first light-turning arrangements and the second light-turning arrangements are distributed across the touch-sensitive region of the substantially planar light guide in a pattern selected from the group consisting of: an equidistant-spacing pattern, a gradient pattern, a chirp pattern, a randomized pattern, and combinations thereof.

5. The apparatus of claim 4, wherein the first light-turning arrangements, the second light-turning arrangements, or the first light turning arrangements and the second light-turning arrangements include light-turning features with randomized feature dimensions.

6. The apparatus of claim 1, wherein:
the first light-turning arrangements are located on a side or sides of the substantially planar light guide selected from the group consisting of the first side and the second side, and
the second light-turning arrangements are located on a side or sides of the substantially planar light guide selected from the group consisting of the first side and the second side.

7. The apparatus of claim 1, wherein:
each first light-turning arrangement includes a first groove substantially parallel to the first edge,
each second light-turning arrangement includes a second groove substantially parallel to the second edge, and
the first grooves and the second grooves are both linear and substantially V-shaped.

8. The apparatus of claim 7, wherein:
the substantially V-shaped first grooves and second grooves are symmetrically trapezoidal in cross section.

9. The apparatus of claim 8, wherein:
the substantially V-shaped first grooves and second grooves are each approximately 10 μm deep, approximately 22 μm wide where the groove opens, and approximately 2 μm wide at the groove bottom.

10. The apparatus of claim 1, wherein the at least one memory further stores computer-executable instructions for controlling the at least one processor to:
filter light detected by the light sensors using a bandpass filter to reject ambient light incident on the first side of the substantially planar light guide.

11. The apparatus of claim 1, wherein the at least one memory further stores computer-executable instructions for controlling the at least one processor to:

modulate light emitted from the light sources according to a signal pattern, and filter light detected by the light sensors to identify detected light that correlates with the signal pattern.

12. The apparatus of claim 1, wherein the at least one memory further stores computer-executable instructions for controlling the at least one processor to:

differentiate between an input location that corresponds with a touch input based on the first magnitude of light's value and an input location that corresponds with a hover input based on the first magnitude of light's value.

13. The apparatus of claim 1, wherein the other XY coordinate is determined by interpolating between locations of the light sensors that detected the first magnitude of light.

14. The apparatus of claim 1, wherein the at least one memory further stores computer-executable instructions for controlling the at least one processor to:

cause a first proper subset to be illuminated at a first time, the first proper subset having a first block of contiguous first light sources and a second block of contiguous second light sources, wherein the first light sources and the second light sources each include approximately half of the light sources;

cause a second proper subset to be illuminated at a second time, the second proper subset having a first block of contiguous first light sources and two second blocks of contiguous second light sources, wherein the first light sources and the second light sources each include approximately half of the light sources and the two second blocks each include substantially equal numbers of second light sources; and cause third through Nth proper subsets to be illuminated at third through Nth times, each third through Nth proper subset having a plurality of first blocks of contiguous first light sources and a plurality of second blocks of contiguous second light sources, wherein:

each third through Nth proper subset has first blocks each including a quantity of contiguous first light sources that is approximately half of the quantity of first light sources in each of the first blocks of the proper subset ranked one level higher, each first block of each third through Nth proper subset is substantially centered on the first light sources at either end of the first block or blocks of the proper subset ranked one higher, the second blocks of each third through Nth proper subset are formed by the light sources not included in the first blocks of that third through Nth proper subset, and the first through Nth proper subsets are each illuminated by causing either the first light sources for all of the first through Nth proper subsets to be illuminated while the second light sources for all of the first through Nth proper subsets are dark or the second light sources for all of the first through Nth proper subsets to be illuminated while the first light sources for all of the first through Nth proper subsets are dark.

15. The apparatus of claim 14, wherein the first through Nth times are non-sequential.

16. An apparatus comprising:

a substantially planar light guide having a first edge, a second edge, a first side, and a second side, wherein:

the first side and the second side are substantially planar and substantially parallel to one another, the first edge and the second edge are both substantially parallel to the first side and to the second side, and the first edge and the second edge are substantially orthogonal to one another;

means, distributed across a touch-sensitive region of the substantially planar light guide, for redirecting light travelling through the substantially planar light guide from the first edge and in a direction substantially parallel to the second edge such that the redirected light exits the substantially planar light guide in a direction substantially normal to the first side;

means, distributed across the touch-sensitive region of the substantially planar light guide, for redirecting light travelling into the substantially planar light guide along a direction substantially normal to the first side such that the redirected light travels towards the second edge in a direction substantially parallel to the first edge;

means for emitting light into the planar light guide along the first edge to form a Gray code pattern;

means for detecting light exiting the planar light guide along the second edge; and processing means for determining X, Y, and Z coordinates for a touch input on or above the first side of the planar light guide based at least in part on light emitted from the means for emitting light and light detected by the means for detecting light.

* * * * *